(12) United States Patent
Parmentier et al.

(10) Patent No.: US 10,329,023 B2
(45) Date of Patent: Jun. 25, 2019

(54) SUPPLY OF AIR TO AN AIR-CONDITIONING CIRCUIT OF AN AIRCRAFT CABIN FROM ITS TURBOPROP ENGINE

(71) Applicants: SNECMA, Paris (FR); SAFRAN, Paris (FR); MICROTURBO, Toulouse (FR)

(72) Inventors: Nicolas Claude Parmentier, Moissy Cramayel (FR); Pierre Froment, Moissy Cramayel (FR); Jean-Francois Rideau, Tournefeuille (FR); Bruno Thoraval, Moissy Cramayel (FR)

(73) Assignees: SAFRAN AIRCRAFT ENGINES, Paris (FR); SAFRAN, Paris (FR); SAFRAN POWER UNITS, Toulouse (FR)

( * ) Notice: Subject to any disclaimer, the term of this patent is extended or adjusted under 35 U.S.C. 154(b) by 0 days.

(21) Appl. No.: 15/115,213

(22) PCT Filed: Jan. 29, 2015

(86) PCT No.: PCT/FR2015/050214
§ 371 (c)(1),
(2) Date: Jul. 28, 2016

(87) PCT Pub. No.: WO2015/114266
PCT Pub. Date: Aug. 6, 2015

(65) Prior Publication Data
US 2016/0332736 A1 Nov. 17, 2016

(30) Foreign Application Priority Data

Jan. 31, 2014 (FR) .................................... 14 00264

(51) Int. Cl.
*B64D 13/06* (2006.01)
*F02C 6/20* (2006.01)
(Continued)

(52) U.S. Cl.
CPC ............. *B64D 13/06* (2013.01); *B64D 13/00* (2013.01); *B64D 13/02* (2013.01); *B64D 13/08* (2013.01);
(Continued)

(58) Field of Classification Search
CPC ............ B64D 13/06; B64D 2013/0618; B64D 13/00; B64D 13/02; B64D 13/08; B64D 27/10; F02C 6/08; F02C 7/32
See application file for complete search history.

(56) References Cited

U.S. PATENT DOCUMENTS

| | | | |
|---|---|---|---|
| 4,503,666 A | 3/1985 | Christoff | |
| 4,684,081 A * | 8/1987 | Cronin | B64D 13/06 244/118.5 |

(Continued)

FOREIGN PATENT DOCUMENTS

| | | |
|---|---|---|
| FR | 1208140 | 2/1960 |
| GB | 2247510 | 3/1992 |

OTHER PUBLICATIONS

International Search Report dated May 18, 2015, for International Application No. PCT/FR2015/050214.

*Primary Examiner* — Kayla Mccaffrey
(74) *Attorney, Agent, or Firm* — Womble Bond Dickinson (US) LLP

(57) ABSTRACT

An aircraft turboprop engine (310) including at least a low-pressure body (12) and a high-pressure body (14), possibly also an intermediate-pressure body. At least one of the bodies includes a compressor. The low-pressure body drives a first gearbox (16) The turboprop engine also includes at least one load compressor (60) for supplying air to an air-conditioning circuit of an aircraft cabin. A rotor (61) of the load compressor is coupled to the low-pressure body. The load compressor (60) includes an air inlet (62) connected to a conduit (72) to bleed air from the compressor of (Continued)

the turboprop engine when all of the aforementioned bodies include only a single compressor, or from the compressor of the low-pressure body or the compressor of the intermediate-pressure body of the turboprop engine when all of the bodies include at least two compressors.

18 Claims, 3 Drawing Sheets

(51) Int. Cl.
    *B64D 13/00*     (2006.01)
    *B64D 13/02*     (2006.01)
    *B64D 13/08*     (2006.01)
    *B64D 27/10*     (2006.01)
    *F04D 29/32*     (2006.01)
    *F04D 29/52*     (2006.01)
    *F04D 29/56*     (2006.01)
    *F04D 29/58*     (2006.01)
    *F02C 7/27*     (2006.01)
    *F02C 9/18*     (2006.01)
(52) U.S. Cl.
    CPC .............. *B64D 27/10* (2013.01); *F02C 6/206* (2013.01); *F02C 7/27* (2013.01); *F02C 9/18* (2013.01); *F04D 29/321* (2013.01); *F04D 29/522* (2013.01); *F04D 29/563* (2013.01); *F04D 29/5833* (2013.01); *B64D 2013/0618* (2013.01); *B64D 2013/0696* (2013.01); *F05B 2220/303* (2013.01); *F05B 2260/20* (2013.01); *F05D 2220/323* (2013.01); *F05D 2220/324* (2013.01); *F05D 2220/325* (2013.01); *F05D 2240/60* (2013.01); *F05D 2260/4031* (2013.01); *Y02T 50/56* (2013.01); *Y02T 50/671* (2013.01); *Y02T 50/675* (2013.01)

(56) References Cited

U.S. PATENT DOCUMENTS

| | | | | |
|---|---|---|---|---|
| 5,722,229 | A * | 3/1998 | Provost | B64D 13/06 60/728 |
| 8,967,528 | B2 * | 3/2015 | Mackin | F02C 6/08 244/134 R |
| 2011/0185698 | A1 * | 8/2011 | Morgan | F02C 9/00 60/39.24 |
| 2013/0040545 | A1 * | 2/2013 | Finney | B64D 13/06 454/71 |
| 2013/0239583 | A1 * | 9/2013 | Suciu | F02C 6/08 60/785 |

* cited by examiner

Fig. 1  - - Prior Art - -

SUPPLY OF AIR TO AN AIR-CONDITIONING CIRCUIT OF AN AIRCRAFT CABIN FROM ITS TURBOPROP ENGINE

TECHNICAL FIELD

The present invention relates to the supply of air to an air-conditioning circuit of an aircraft cabin that is equipped with at least one turboprop engine.

PRIOR ART

On board an aircraft, it is necessary to have air available in order to be able to perform certain functions, such as the air conditioning of the cockpit and the passenger cabin or the de-icing of certain components of the aircraft. At high altitudes, the oxygen becomes scarcer and the air pressure drops. This involves pressurising the aircraft cabins in order to ensure the comfort and survival of the passengers during a flight. For this purpose, air with a minimum pressure level (in general between 0.8 and 1 bar) and a controlled temperature (regulatory requirement) must be supplied to the air-conditioning circuit. An aircraft is thus equipped with an air-conditioning circuit that is supplied by the engine or engines of the aircraft, which are turboprop engines in the context of the invention.

Typically, a turboprop engine comprises at least one low-pressure body and one high-pressure body, the low-pressure body driving a propulsion propeller by means of a gearbox or reduction gearbox, normally referred to as a PGB (standing for power gearbox). The low-pressure body comprises a turbine rotor connected by a shaft to the propeller and optionally to a compressor. Each other body comprises a compressor rotor connected by a shaft to a turbine rotor.

In the prior art, the air-conditioning circuit is supplied by air taken from one of the compressors of the turboprop engine. This does however present drawbacks, the most significant of which are:
- the pressure of the air supplied to the aircraft greatly exceeds requirements, in particular during the climbing phase of the aircraft, which requires protection devices in case of overpressure and requires the air pipes to be dimensioned accordingly,
- the temperature of the air taken off, at the compressor, greatly exceeds the regulatory constraint (maximum temperature on passing through the fuel zones), which requires a cooling device that is difficult to integrate in the nacelle (generally referred to as a precooler) before the air is sent to the aircraft circuit,
- a large amount of energy is lost, which is detrimental to the consumption and efficiency of the turboprop engine,
- the pressure in the compressor drops on idling, which requires either the idling level of the turboprop engine to be increased in order to have sufficient pressure in the circuit, or air to be taken off at two points on the compressor, which requires two take-off ports and the same number of valves for switching the taking of air from one point to another, which is relatively complex. In both cases this gives rise to overconsumption of fuel on idling.

Solutions to this problem have already been proposed. It has in particular been proposed to supply an air-conditioning circuit with air taken from an auxiliary heat engine of the APU (auxiliary power unit) type installed in the aircraft. However, the operation of this engine is optimised on the ground and is therefore not efficient at altitude. The use thereof, except when there is an engine malfunction, involves additional consumption of fuel compared with the previous technique. Moreover, not all aircrafts are equipped with an engine of the APU type.

It has also been proposed to equip the aircraft with a dedicated compressor (dedicated to the supply of air to the cabin) driven by an electric motor. However, this solution is not satisfactory since it gives rise to a significant increase in mass, in particular because of the addition of the electric motor and a larger electricity generator for supplying this motor.

One solution to this problem could involve driving the dedicated compressor by the gearbox driving the accessory equipment of the engine, generally referred to as an accessory gearbox or AGB. This accessory gearbox is coupled to the high-pressure body of the turbine engine. However, this solution would not be satisfactory either since the speed of rotation of the high-pressure body varies to such an extent according to the operating conditions that the speed of rotation of the rotor of the dedicated compressor would be too low at idle speed for this compressor to be capable of providing an airflow at the minimum pressure required for the air-conditioning circuit.

Another solution to this problem may involve driving the compressor by means of a power takeoff on the propulsion-propeller reduction gearbox, as described in the document FR-1.208-140-A. However, this solution has the same drawbacks as the previous solution since the speed of rotation of the body to which the propeller is coupled varies to such an extent according to the operating conditions that the speed of rotation of the rotor of the dedicated compressor would be too low at idle speed for this compressor to be capable of providing an airflow at the minimum pressure required for the air-conditioning circuit.

The present invention proposes a simple, effective and economical solution to at least some of the problems of the prior art.

DISCLOSURE OF THE INVENTION

The invention proposes an aircraft turboprop engine comprising at least one low-pressure body and one high-pressure body, or even also an intermediate-pressure body, at least one of said bodies comprising a compressor, the low-pressure body driving a propulsion propeller by means of a first gearbox, the turboprop engine further comprising means for supplying air to an air-conditioning circuit of an aircraft cabin, characterised in that said supply means comprise at least one load compressor, the rotor of which is coupled to the low-pressure body, said compressor comprising an air inlet connected to means for taking off air from:
- the compressor of the turboprop engine, when all of said bodies include only one compressor, or
- the compressor of the low-pressure body or of the intermediate-pressure body of the turboprop engine, when all of said bodies include at least two compressors.

It is thus not necessary to equip the turboprop engine with an air-takeoff scoop in the airflow that flows in operation around and outside the turboprop engine. This type of scoop has the drawback of generating turbulence in this airflow and of requiring specific de-icing means. The air supply to the compressor is thus not dependent on the airflow outside the turboprop engine.

Advantageously, the air is taken off in the first stage or the first stages of the compressor, which makes it possible to limit the compression requirements of the load compressor.

The load compressor can thus be smaller, in order to improve its compression efficiency. It is also easier to cool the air for the aircraft cabin.

The invention moreover makes it possible to reduce the cross section of the air-takeoff conduit in the compressor compared with the cross section of the previous conduit, because of the higher pressure of the air taken off.

The rotor of the compressor can be coupled to the low-pressure body by means of the first gearbox.

In a variant, the rotor of the compressor is coupled to the low-pressure body by means of a second gearbox.

The present invention thus proposes new technology for the supply of air to an air-conditioning circuit of an aircraft cabin. This air is supplied by a compressor, preferably dedicated to the supply of air to the cabin, rather than taken off from a compressor of the turboprop engine, which is less detrimental to performance. According to the invention, the rotor of this dedicated compressor is rotated by the low-pressure body, by means of a gearbox, such as the (first) gearbox that connects the low-pressure body to the propulsion propeller. This is particularly advantageous, in particular when the turboprop engine is configured so that the speed of rotation of its low-pressure body obeys a discrete-speed law, that is to say each speed is constant in steps. The speed of the propeller may be within a fairly restricted range since it may no longer be functional if it slows down too much. The speed of rotation of the low-pressure body is in particular constant during the same flight phase. Flight phase means a phase during which the aircraft is performing only one type of manoeuvre. Thus the speed of rotation of the rotor of the dedicated compressor will not depend on the operating conditions, and the dedicated compressor will be able to provide airflow at the minimum pressure required for the air-conditioning circuit, even at idle speed. Moreover, it is no longer necessary to provide at least two air-takeoff ports on the compressor, as well as the associated valves, which is simpler.

The dedicated compressor may have one or a plurality of stages, each of any type, for example an axial or centrifugal stage.

The compressor may comprise an air inlet connected to air-takeoff means between an air inlet sleeve and a compressor of the turboprop engine.

A heat exchanger, for example of the precooler type, can be installed either upstream or downstream of the dedicated compressor.

A heat exchanger may be mounted between two compressors or two compressor stages (if it has at least two thereof), one of which may be formed by said load compressor. The two compressors or two compressor stages may make up the load compressor that is dedicated in particular to the supply of air to the cabin. In a variant, the exchanger is disposed between the low-pressure or intermediate-pressure compressor and the dedicated compressor. The advantage of placing a heat exchanger in this way is that it is more effective than at the outlet of the dedicated compressor (for the same quantity of heat discharged by the exchanger, the reduction in temperature of the air sent to the aircraft is greater). This makes it possible for example to use a smaller heat exchanger than in the prior art.

The load compressor may comprise an air outlet connected to a pipe intended to be connected to said circuit. This pipe may be equipped with at least one flow regulation system, for example a valve. It may be equipped with a heat exchanger, for example of the precooler type. This precooler can be simplified and can be more compact than in the prior art because the air supplying the dedicated compressor may have a relatively low temperature compared with the prior art. It can moreover be envisaged that the pressure of the air emerging from the dedicated compressor is close to the air pressure in the conditioning circuit, and therefore relatively low, which makes it possible to simplify the pipe and in particular to use a pipe with a thin wall in order to obtain a saving in mass compared with the prior art.

Advantageously, the turboprop engine may comprise a pneumatic starter, an air inlet of which is connected to said pipe. In the starting phase, the rotor of the pneumatic starter is coupled to the high-pressure body by an accessory gearbox and supplied with air by the aircraft via said pipe. Valves exclusively supply air to the starter. The present invention also makes it possible to supply the pneumatic starter via the pipes of the air-conditioning circuit.

The present invention also relates to a method for supplying air to an air-conditioning circuit of a cabin of an aircraft that is equipped with at least one turboprop engine comprising at least one low-pressure body and one high-pressure body, or even also an intermediate-pressure body, at least one of said bodies comprising a compressor, the low-pressure body driving a propulsion propeller by means of a first gearbox, characterised in that it comprises the steps involving taking off air either from the compressor of the turboprop engine, when all of said bodies comprise only one compressor, or from the compressor of the low-pressure body or of the intermediate-pressure body of the turboprop engine, when all of said bodies comprise at least two compressors, supplying at least one dedicated load compressor with the air taken off and driving a rotor of said load compressor by means of the low-pressure body of the turboprop engine.

DESCRIPTION OF THE FIGURES

The invention will be better understood and other details, features and advantages of the invention will emerge from reading the following description given by way of non-limiting example and with reference to the accompanying drawings, in which.

DETAILED DESCRIPTION

Figure 1:
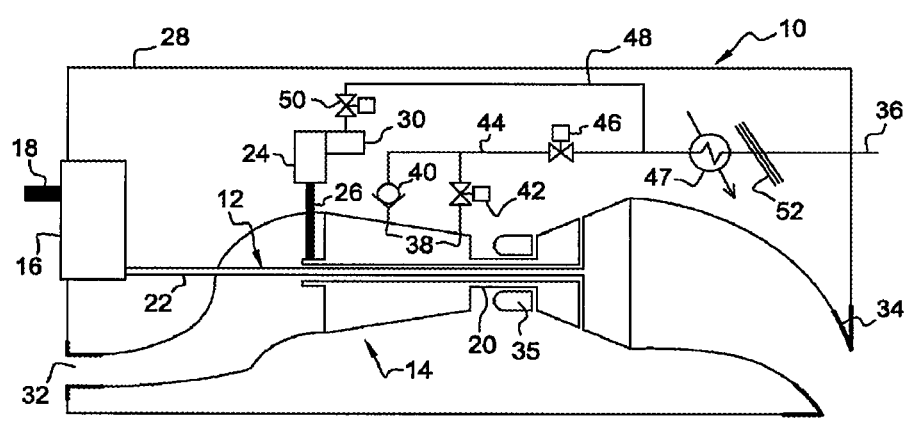
FIG. 1 is a highly schematic view of an aircraft turboprop engine and depicts means for supplying air to an air-conditioning circuit of a cabin of the aircraft, according to the prior art.

Reference is made first of all to FIG. 1, which depicts a turboprop engine 10 according to the prior art, for an aircraft.

In this case, the turboprop engine 10 is of the double-body type and comprises a low-pressure body 12 and a high-pressure body 14, the low-pressure body 12 driving a propulsion propeller by means of a gearbox 16 or reduction gearbox, usually referred as a PGB (power gearbox). Only the shaft 18 of the propulsion propeller is shown in FIG. 1.

In this case, the low-pressure body 12 comprises only a turbine rotor connected by a shaft to the gearbox 16. The high-pressure body 14 comprises a compressor rotor connected by a shaft to a turbine rotor. The shaft of the high-pressure body 14, referred to as HP shaft 20, is tubular and has the shaft of the low-pressure body 12, referred to as the LP or power shaft 22, passing coaxially therethrough. The LP shaft 22 comprises at one end a pinion (not shown) coupled by means of a series of pinions of the gearbox 16 to the shaft 18 of the propulsion propeller.

The turboprop engine 10 comprises a box 24 for driving accessory equipment (referred to as the accessory box or AGB, standing for accessory gearbox) that is coupled to the high-pressure body of the turbine engine 14, and in particular to the HP shaft, by means of a radial shaft 26. The accessory gearbox 24 is mounted in the nacelle 28 of the turboprop engine 10, which is depicted schematically by a rectangle in dotted lines.

The accessory gearbox 24 carries and drives a plurality of items of equipment, including a pneumatic starter 30 which, as its name indicates, is intended to start the turboprop engine 10 by rotating its high-pressure body, by means of the accessory gearbox 24 and the radial shaft 26.

The turboprop engine 10 further comprises an air inlet 32 for supplying air to the engine, and a combustion-gas exhaust pipe 34. The turboprop engine 10 further comprises a combustion chamber 35, between the LP and HP compressors on the one hand and the HP and LP turbines on the other hand.

The turboprop engine 10 is further equipped with means for supplying air to an air-conditioning circuit 36 of a cabin of the aircraft, these means comprising, according to the prior art, means for taking air from the turboprop engine 10. The turboprop engine 10 is equipped with two ports 38 or orifices for taking off compressed air, each of these ports 38 being connected by a valve 40, 42 to a pipe 44 supplying air to the circuit 36.

The first port 38 or upstream port (with reference to the direction of flow of the gases in the engine) makes it possible to take off air at an intermediate pressure. The valve 40 connected to this pipe 44 is of the non-return valve type.

The second port 38 or downstream port makes it possible to take off air at high pressure. The valve 42 connected to this pipe 44 is opened when the pressure of the air taken off by the valve 40 is not sufficient, the air taken off by the valve 40 being prevented from being reinjected upstream by the non-return function of the shutter of the valve 40.

The pipe 44 is equipped with a valve 46 that regulates the supply pressure of the circuit 36, and a heat exchanger 47 of the precooler type, which is intended to lower the temperature of the air before it is introduced into the circuit 36. The pipe 44 is further connected to an air inlet of the pneumatic starter 30 by a conduit 48 equipped with a valve 50. The pipe 44 passes through a fire-resistant partition 52 before being connected to the circuit 36.

The technology depicted in FIG. 1 has numerous drawbacks described above.

The present invention makes it possible to overcome these drawbacks by equipping the turboprop engine with a dedicated compressor, referred to as a load compressor, the rotor of which is coupled to the low-pressure body of the engine by means of the gearbox.

Figure 3:
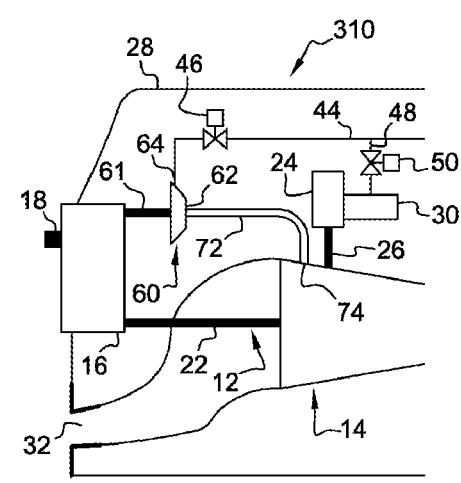
FIG. 3 is a highly schematic view of an aircraft turboprop engine and depicts means for supplying air to an air-conditioning circuit of a cabin of the aircraft, according to an embodiment of the invention.

FIG. 3 depicts an embodiment of this invention in which the elements already described above are designated by the same reference numerals. The turboprop engine in FIG. 3 may be of the same type as that depicted in FIG. 1, or of a different type. It may for example comprise more than two bodies. Moreover, the low-pressure body of the turboprop engine according to the invention may comprise an LP compressor.

The turboprop engine 310 of FIG. 3 differs from that in FIG. 1 essentially by the means for supplying air to the circuit 36.

Figure 2:
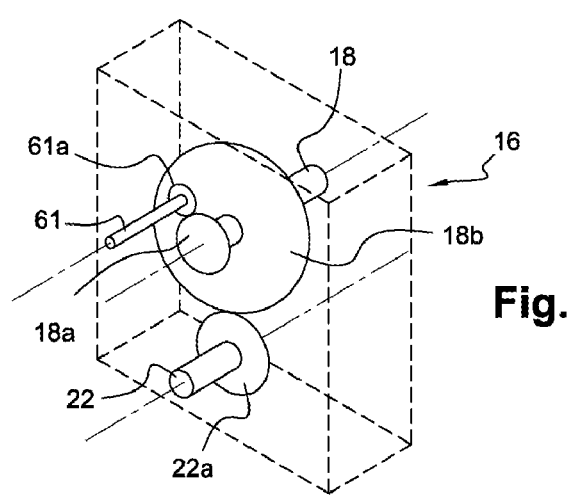
FIG. 2 is a highly schematic view of a gearbox for driving the dedicated compressor of the air supply means according to the invention.

In this case, these supply means comprise a dedicated compressor 60, the rotor 61 of which is coupled by the gearbox 16 to the low-pressure body 12 and in particular to the LP shaft 22. As depicted schematically in FIG. 2, the rotor shaft 61 of the compressor 60 can carry a pinion 61a meshing with a pinion 18a of the shaft 18 of the propeller of the turboprop engine 310, this shaft 18 carrying another pinion 18b meshing with a pinion 22a of the LP shaft 22. The pinions 18a, 18b, 22a, 61a are housed in the gearbox 16.

The compressor 60 comprises an air inlet 62 and an air outlet 64. In the example depicted, the air outlet 64 of the compressor 60 is connected to the pipe 44 supplying air to the circuit 36. As described previously, this pipe 44 comprises a valve 46 that regulates the supply pressure of the circuit 36, and a heat exchanger 47 of the precooler type, which is intended to reduce the temperature of the air before it is introduced into the circuit 36. The pipe 44 is further connected to an air inlet of the pneumatic starter 30 by a conduit 48 equipped with a valve 50.

The air inlet 62 of the compressor 60 is connected by a conduit 72 to a port 74 for taking off air from a compressor of the engine. Although air is taken off from the engine, the engine is equipped with a single take-off port compared with two in the prior art. Because of the compression of the air taken off from the compressor 60, the air taken off does not need to have a high pressure. Taking off air as far upstream as possible on the compressor can therefore be envisaged.

The taking off of air can take place on the low-pressure compressor, that is to say the compressor of the low-pressure body 12. This is particularly the case in a double-body turboprop engine with a connected turbine. In the case where the turboprop engine is of the triple body type (and comprising an intermediate-pressure body with a compressor disposed upstream of the high-pressure compressor) and with a free turbine, the air could be taken off from the intermediate-pressure compressor. In the case where the turboprop engine is of the triple body type (and comprising an intermediate-pressure body, with a compressor disposed upstream of the high-pressure compressor and downstream of the low-pressure compressor) and with a connected turbine, the air could be taken off from the low-pressure compressor or intermediate-pressure compressor. In the case where the turboprop engine is of the double body and free turbine type, the air could be taken off from the high-pressure compressor. The main idea is to benefit solely from the first compression stage or stages (preferably maximum fourth stage) in order to limit the size and performance of the load compressor. If possible the lowest-pressure compressor is used in order to maximise the operability of the high-pressure body or of the intermediate-pressure body. Two successive compressions, in the compressor of a body and in the load compressor, respectively, make it possible to improve the thermodynamic cycle.

The load compressor 60 used in the context of the invention (FIG. 3) may be of any type and is for example an axial compressor with one or more stages or a centrifugal compressor with one or more stages or a mixed compressor comprising one of more axial stages and one or more centrifugal stages.

It can also be envisaged to use more than one load compressor and for example two load compressors connected in series.

Figure 4A:
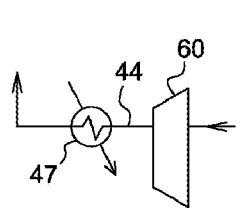
FIGS. 4a, 4b and 4c are highly schematic views of variants of the air supply means of the aircraft according to the invention.
Figure 4B:
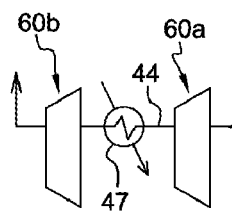
Figure 4C:
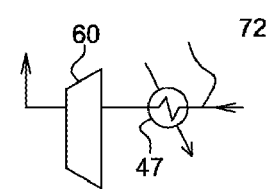

FIGS. 4a to 4c depict variants of the invention relating in particular to the position of the heat exchanger 47. As can be seen in FIG. 4a, the heat exchanger 47 can be mounted downstream of the compressor 60, that is to say on the pipe 44, as is the case in FIG. 2. In FIG. 4b, the heat exchanger 47 is mounted between two compressors 60a, 60b. Each compressor may comprise one or more stages in order to cover the aforementioned two cases. Each stage may be an axial or centrifugal stage. In FIG. 4c, the exchanger 47 is mounted upstream of the compressor 60, that is to say on the conduit 72 described with reference to FIG. 3. The exchanger 47 is thus mounted between the compressors (low-pressure and load compressors), which optimises the air-cooling cycle.

Figure 5:
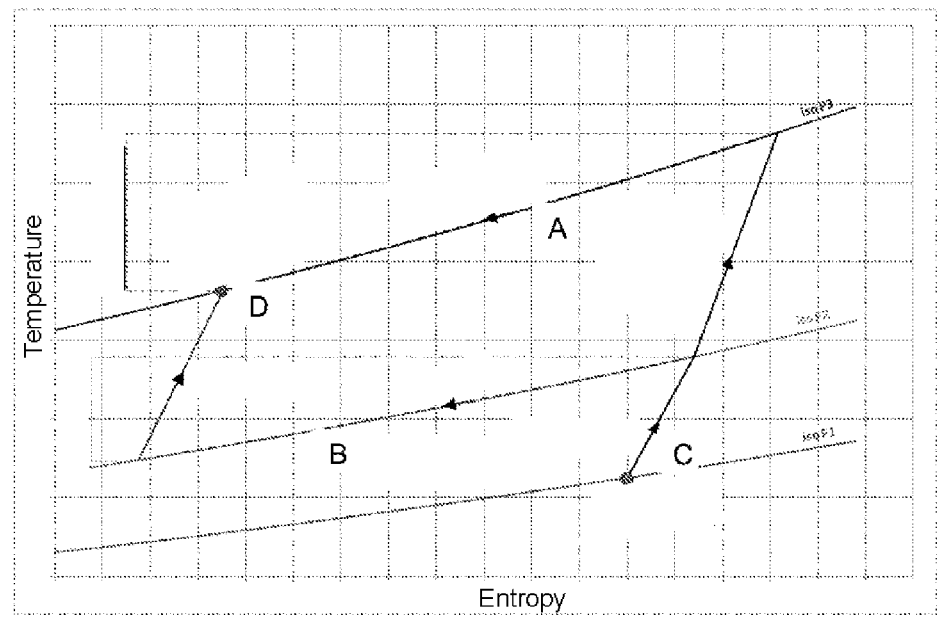
FIG. 5 is a diagram showing the change in the temperature of air taken off as a function of entropy.

The diagram in FIG. 5 illustrates the compression of the ambient air for sending to the aircraft. It is necessary to compress the air taken off to bring it from the pressure P1 to the pressure P3, and an exchanger 47 is used to limit the output temperature. C represents the taking off of air and D represents the discharge from the load compressor 60. It can be seen that, if the exchanger is placed after the entirety of the compression (precooler configuration A), it must dissipate more heat than if it is placed after a first lower compression (intercooler configuration B), supplemented by a second compression in order to arrive at the pressure P3.

Figure 6:
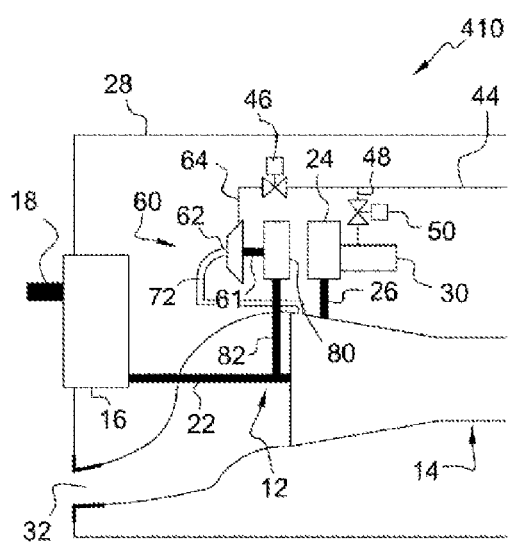
FIG. 6 is a view similar to that of FIG. 3 and depicts a variant of the invention.

FIG. 6 depicts another variant of the turboprop engine 410 according to the invention, which differs from that of FIG. 3 essentially in that the rotor 61 of the compressor 60 is coupled to the LP shaft 22 not by the gearbox 16 but by another gearbox 80, which can be dedicated in order to fulfill this function of coupling the LP shaft to the rotor of compressor 60. The gearbox 80 can be coupled to the LP shaft 22 by means of a radial shaft 82.

The supply of air to the circuit 36 can be achieved as follows, with any of the embodiments of the invention described above.

After the turboprop engine 310, 410 is started up, the low-pressure body 12 and its shaft 22 in general rotate at a substantially constant speed. The rotor of the compressor 60 is rotated at a substantially constant speed, which depends in particular on the step-down coefficient of the gearbox 16, 80. The rotation of the rotor shaft 61 of the compressor 60 causes the suction and take off of air by the conduit 72, as far as the air inlet 62 of the compressor 60. This air is then compressed by the compressor 60, which supplies compressed air to the pipe 44 at a predetermined pressure. The valve 46 regulates the supply pressure of the circuit 36. The heat exchanger 47 makes it possible to reduce the temperature of the air before it is introduced into the circuit 36 (FIG. 4a), before it enters the compressor (FIG. 4c) or between two compression phases (FIG. 4b). Whatever the operating conditions of the turboprop engine 310, 410, the rotor shaft 61 of the compressor 60 rotates at a constant speed in the case where the speed of rotation of the low-pressure body 12 is also constant.

The invention claimed is:

1. An aircraft turboprop engine comprising at least one low-pressure body and one high-pressure body, at least one of said bodies comprising a compressor, the low-pressure body driving a propulsion propeller by means of a first gearbox mechanically coupled to the propulsion propeller, the turboprop engine further comprising means for supplying air to an air-conditioning circuit of an aircraft cabin, wherein said supply means comprise at least one load compressor, the rotor of which is mechanically coupled to a shaft of the low-pressure body by means of said first gearbox, said load compressor comprising an air inlet connected to a single take-off port of the turboprop engine for taking off air from:
   the compressor of the low pressure body of the turboprop engine, when the turboprop engine is a double body turboprop engine comprising one low-pressure body and one high-pressure body, or
   the compressor of the low-pressure body or of an intermediate-pressure body of the turboprop engine, when the turboprop engine is a triple body turboprop engine comprising one low-pressure body, one intermediate pressure body, and one high-pressure body.

2. The aircraft turboprop engine according to claim 1, wherein a heat exchanger is mounted upstream or downstream of the load compressor.

3. The aircraft turboprop engine according to claim 2, wherein each compressor comprises compressor stages and wherein the single take-off port takes off air from at maximum a fourth stage of said compressor stages.

4. The aircraft turboprop engine according to claim 1, wherein said engine comprises two load compressors and wherein a heat exchanger is mounted between said two load compressors.

5. The aircraft turboprop engine according to claim 4, wherein said turboprop engine comprises a pneumatic starter, an air inlet of which is connected to a pipe.

6. The aircraft turboprop engine according to claim 5, wherein the pipe is equipped with a heat exchanger.

7. The aircraft turboprop engine according to claim 6, wherein each compressor comprises compressor stages and wherein the single take-off port takes off air from at maximum a fourth stage of said compressor stages.

8. The aircraft turboprop engine according to claim 5, wherein each compressor comprises compressor stages and wherein the single take-off port takes off air from at maximum a fourth stage of said compressor stages.

9. The aircraft turboprop engine according to claim 4, wherein each compressor comprises compressor stages and wherein the single take-off port takes off air from at maximum a fourth stage of said compressor stages.

10. The aircraft turboprop engine according to claim 1, wherein the load compressor comprises an air outlet connected to a pipe supplying air to said air-conditioning circuit, said pipe being equipped with at least one regulation means.

11. The aircraft turboprop engine according to claim 10, wherein each compressor comprises compressor stages and wherein the single take-off port takes off air from at maximum a fourth stage of said compressor stages.

12. The aircraft turboprop engine according to claim 1, wherein said turboprop engine is configured so that the speed of rotation of the low-pressure body is substantially constant in steps, the speed of rotation of the low-pressure body obeying a discrete speed by which said speed is constant during a same flight phase, whatever the operating conditions.

13. The aircraft turboprop engine according to claim 1, wherein each compressor comprises compressor stages and wherein the single take-off port takes off air from at maximum a fourth stage of said compressor stages.

14. The aircraft turboprop engine according to claim 1, wherein said turboprop engine comprises the at least one load compressor having at least two load compressor stages, and wherein a heat exchanger is mounted between said at least two load compressor stages.

15. The aircraft turboprop engine according to claim 1, wherein a heat exchanger is mounted between said at least one load compressor and:
- the compressor of the low pressure body of the turboprop engine, when the turboprop engine is a double body turboprop engine comprising one low-pressure body and one high-pressure body, or
- the compressor of the low-pressure body or of the intermediate-pressure body of the turboprop engine, when the turboprop engine is a triple body turboprop engine comprising one low-pressure body, one intermediate pressure body, and one high-pressure body.

16. Method for supplying air to an air-conditioning circuit of a cabin of an aircraft that is equipped with at least one turboprop engine comprising at least one low-pressure body and one high-pressure body, at least one of said bodies comprising a compressor, the low-pressure body driving a propulsion propeller by means of a first gearbox mechanically coupled to the propulsion propeller wherein said method comprises the steps involving taking off air from:
- the compressor of the low pressure body of the turboprop engine, when the turboprop engine is a double body turboprop engine comprising one low-pressure body and one high-pressure body, or
- the compressor of the low-pressure body or of an intermediate-pressure body of the turboprop engine, when the turboprop engine is a triple body turboprop engine comprising one low-pressure body, one intermediate pressure body, and one high-pressure body,
- for supplying at least one dedicated load compressor, a rotor of which is mechanically coupled to a shaft of the low pressure body by means of said first gearbox, with the air taken off and driving the rotor of said load compressor by means of the low-pressure body of the turboprop engine.

17. An aircraft turboprop engine comprising one low-pressure body and one high-pressure body, at least one of said bodies comprising a compressor, the low-pressure body driving a propulsion propeller by means of a first gearbox mechanically coupled to the propulsion propeller, the turboprop engine further comprising means for supplying air to an air-conditioning circuit of an aircraft cabin, wherein said supply means comprise at least one load compressor, the rotor of which is mechanically coupled to a shaft of the low-pressure body by means of said first gearbox, said load compressor comprising an air inlet connected to a single take-off port of the turboprop engine for taking off air from the compressor of the low pressure body of the turboprop engine.

18. An aircraft turboprop engine comprising one low-pressure body, one high-pressure body, and also an intermediate-pressure body, at least one of said bodies comprising a compressor, the low-pressure body driving a propulsion propeller by means of a first gearbox mechanically coupled to the propulsion propeller, the turboprop engine further comprising means for supplying air to an air-conditioning circuit of an aircraft cabin, wherein said supply means comprise at least one load compressor, the rotor of which is mechanically coupled to a shaft of the low-pressure body by means of said first gearbox, said load compressor comprising an air inlet connected to a single take-off port of the turboprop engine for taking off air from the compressor of the low-pressure body or of the intermediate-pressure body of the turboprop engine.

* * * * *

UNITED STATES PATENT AND TRADEMARK OFFICE
CERTIFICATE OF CORRECTION

PATENT NO. : 10,329,023 B2
APPLICATION NO. : 15/115213
DATED : June 25, 2019
INVENTOR(S) : Nicolas Claude Parmentier et al.

Page 1 of 1

It is certified that error appears in the above-identified patent and that said Letters Patent is hereby corrected as shown below:

On the Title Page

In item [73], under Assignee, delete "SAFRAN AIRCRAFT ENGINGES," insert --SAFRAN AIRCRAFT ENGINES--.

Signed and Sealed this
Tenth Day of December, 2019

Andrei Iancu
*Director of the United States Patent and Trademark Office*